(12) United States Patent
Noesner (10) Patent No.: US 9,549,453 B2
(45) Date of Patent: Jan. 17, 2017

(54) REMOTELY PROGRAMMING A PHOTOCONTROL DEVICE

(71) Applicant: ABL IP Holding LLC, Conyers, GA (US)

(72) Inventor: Kevin E. Noesner, Dublin, OH (US)

(73) Assignee: ABL IP Holding LLC, Decatur, GA (US)

( * ) Notice: Subject to any disclaimer, the term of this patent is extended or adjusted under 35 U.S.C. 154(b) by 0 days.

(21) Appl. No.: 14/748,659

(22) Filed: Jun. 24, 2015

(65) Prior Publication Data

US 2015/0382435 A1 Dec. 31, 2015

Related U.S. Application Data

(60) Provisional application No. 62/016,770, filed on Jun. 25, 2014.

(51) Int. Cl.
*H05B 37/02* (2006.01)

(52) U.S. Cl.
CPC ...... *H05B 37/0272* (2013.01); *H05B 37/0227* (2013.01)

(58) Field of Classification Search
CPC .................................. H05B 37/02; G09G 3/34
USPC ................. 315/151–154, 156.312, 291, 292, 293,315/294, 307–308
See application file for complete search history.

(56) References Cited

U.S. PATENT DOCUMENTS

| 9,204,523 B2 | 12/2015 | Reed et al. | |
| 2012/0044350 A1* | 2/2012 | Verfuerth | H05B 37/0272 348/143 |
| 2013/0342131 A1* | 12/2013 | Recker | H05B 33/0842 315/292 |
| 2014/0103819 A1* | 4/2014 | Mohan | H05B 37/0254 315/159 |
| 2015/0382434 A1 | 12/2015 | Noesner et al. | |

OTHER PUBLICATIONS

U.S. Appl. No. 14/314,287, filed Jun. 25, 2014.
Notice of Allowance for U.S. Appl. No. 14/314,287, mailed Jan. 14, 2016, 8 pages.

* cited by examiner

*Primary Examiner* — Minh D A
(74) *Attorney, Agent, or Firm* — Kilpatrick Townsend & Stockton, LLP (57) ABSTRACT

Disclosed are various methods for lighting control of a light fixture by a remote device. The remote device receives, via a wireless network interface, an identifier from a photocontrol device that manages light output of the light fixture. The remote device transmits a request to establish a point-to-point communication session directly with the photocontrol device using the wireless network interface. Upon receiving an acknowledgement from the photocontrol device confirming establishment of the communication session, the remote device uses the established communication session for receiving a configuration for the photocontrol device. In response to input received, via a user interface of the remote device, to adjust a dimming schedule for the photocontrol device, the remote device instructs the photocontrol device to modify its configuration based upon the received input.

20 Claims, 8 Drawing Sheets

REMOTELY PROGRAMMING A PHOTOCONTROL DEVICE

CROSS-REFERENCE TO RELATED APPLICATIONS

This application claims priority to U.S. Provisional Application No. 62/016,770 filed Jun. 25, 2014, the contents of which are incorporated herein by reference.

BACKGROUND

Lighting systems may be deployed to provide lighting for various environments such as parking lots, roadways, sidewalks, structures, etc. In some of these environments, the illumination from the fixtures may be managed by photocontrols that adjust the amount of light produced based upon the amount of ambient light detected by the photocontrol. For example, a photocontrol placed outside may switch off light output from the light fixture during daylight hours and switch on the light output during the evening.

However, changing the programming of these photocontrols to, for example, modify the light output level or temporarily switch on the light, may be a complicated task. To accomplish the task, a user often needs to have physical access to the photocontrol, which may be installed in a location that is difficult to access, such as atop a 40-ft. light pole. The difficulty can be magnified when there are many photocontrols which need to be adjusted.

SUMMARY

Various aspects of the present invention relate to configuring a photocontrol device to manage light output of a light fixture through use of a radio frequency (RF) remote control device. The remote device receives, via a wireless network interface, an identifier from the photocontrol device within range of the wireless network interface of the remote device. The wireless network interface may use Bluetooth®, Wi-Fi®, and/or other possible protocols. The photocontrol device may be removably attached to the light fixture. The remote device transmits, via the wireless network interface, a request to establish a point-to-point communication session directly with the photocontrol device using the wireless network interface. The request may include an authentication credential.

Upon receiving, via the wireless network interface, an acknowledgement from the photocontrol device confirming establishment of the communication session, the remote device uses the established communication session to receive a configuration for the photocontrol device. The configuration specifies how the photocontrol device is programmed to manage the light output of the light fixture. The configuration may include settings associated with dimming the light output and possibly a schedule associated with the dimming. The photocontrol may support other features including fixture identification, occupancy sensing, temperature protection, and/or other possible features that are configured through the configuration. In response to input received, via a user interface of the remote device, to adjust the configuration, the remote device instructs the photocontrol device to modify the configuration for the photocontrol device. The modification may be associated with the dimming and/or with other features of the photocontrol.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
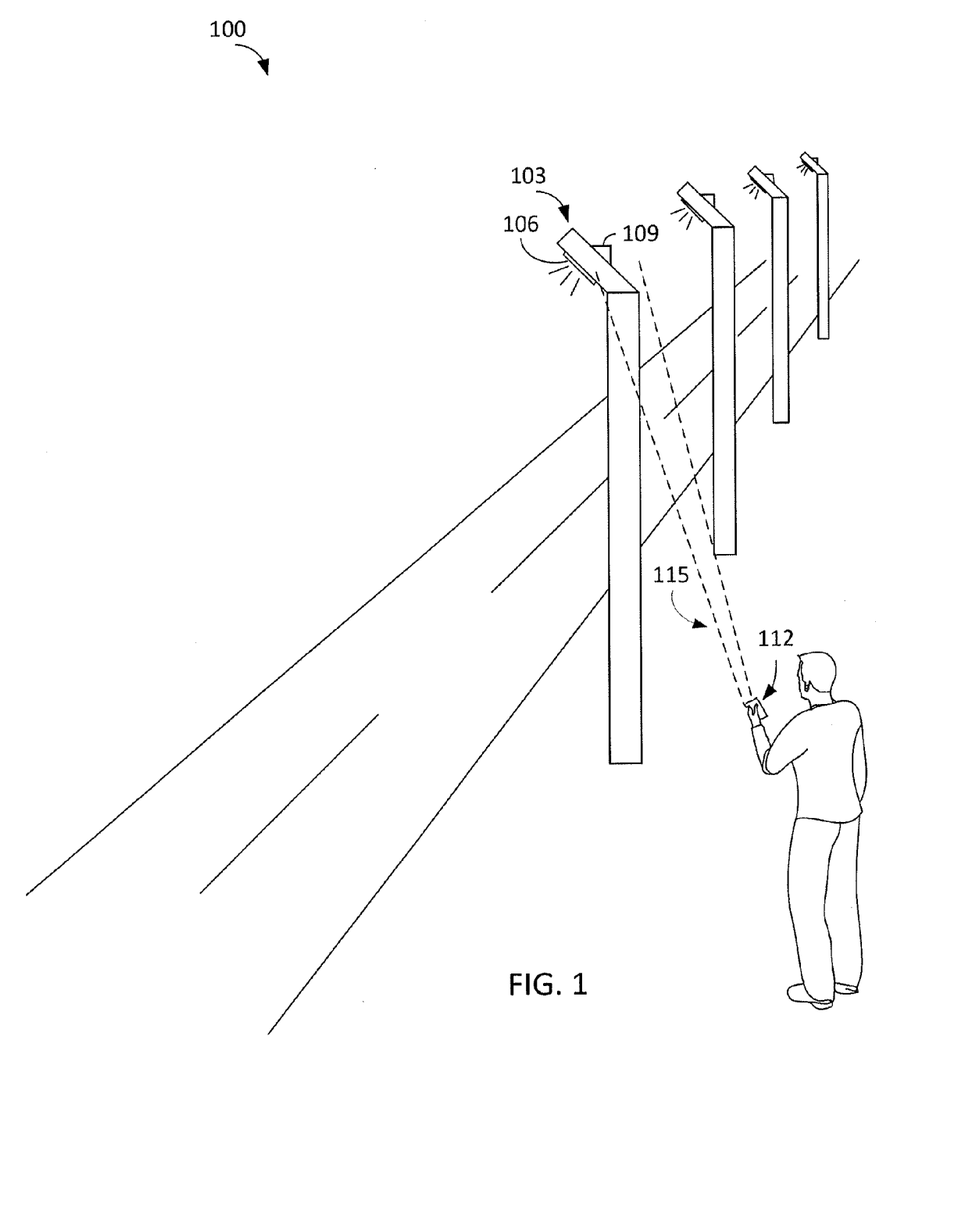
FIG. 1 is a drawing of an exemplary lighting environment according to various embodiments of the present disclosure.

Embodiments of the present invention are generally directed to remotely managing a photocontrol for one or more light fixtures, where the photocontrol includes programming associated with adjusting the light output from one or more lighting elements associated with each light fixture. With reference to FIG. 1, shown is an exemplary lighting environment 100. The lighting environment 100 includes various lighting fixtures, including the light fixture 103, for illuminating objects in the lighting environment 100, such as the roadway shown in this illustrative example. The light fixture 103 may be affixed to a structure, such as the pole shown, and may include an illuminating element 106, a photocontrol device 109, and other possible components. The illuminating element 106 is capable of producing light output for illuminating objects in the lighting environment 100. The illuminating element 106 may be a light-emitting diode (LED), a fluorescent lamp, an incandescent lamp, and/or other possible light emitting device(s).

The photocontrol device 109 may be used to control the light output from the illuminating element 106 of the light fixture 103, where control of the light output may be determined using one or more inputs to the photocontrol device 109. The photocontrol device 109 for a given light fixture 103 may be a hard-wired component of the light fixture 103, may be attached to a standard receptacle on the light fixture 103, or may be located remotely from the light fixture 103. As an example, the receptacle may be a National Electrical Manufacturers Association (NEMA) multi-pin receptacle (e.g. 3, 5, or 7 pins) to which the photocontrol 109 may be removably attached.

The photocontrol device 109 may sense the ambient light in the local area and modify the light output of the light fixture 103 based on the amount of ambient light. For example, the photocontrol device 109 may be programmed to dim the illuminating element 106 for a light fixture 103 when the detected amount of light exceeds a threshold (e.g. during daylight), and to brighten the illuminating element 106 when the amount of light does not reach the threshold (e.g. during evening). Additionally, the photocontrol device 109 may modify the light output of the light fixture 103 based further on a programmed dimming schedule and/or input from one or more other sensors, such as an occupancy sensor, temperature sensor, etc., as described herein.

The photocontrol device 109 may also receive input from a remote device 112 via a wireless network interface (e.g. a Bluetooth® Low-Energy (BLE) network interface). After establishing a communication session over a network 115 between the remote device 112 and photocontrol 109, the remote device 112 may send commands to modify the programming or other configuration of the photocontrol 109 for the light fixture 103. In some implementations, the communication session may be "point-to-point," defined herein to mean a direct communication session between the remote device 112 and the photocontrol 109, without the use of intermediate network devices (e.g. network routers, switches, etc.). In the following discussion, further description of the system and its components is provided, followed by a discussion of the operation of the same.

Figure 2:
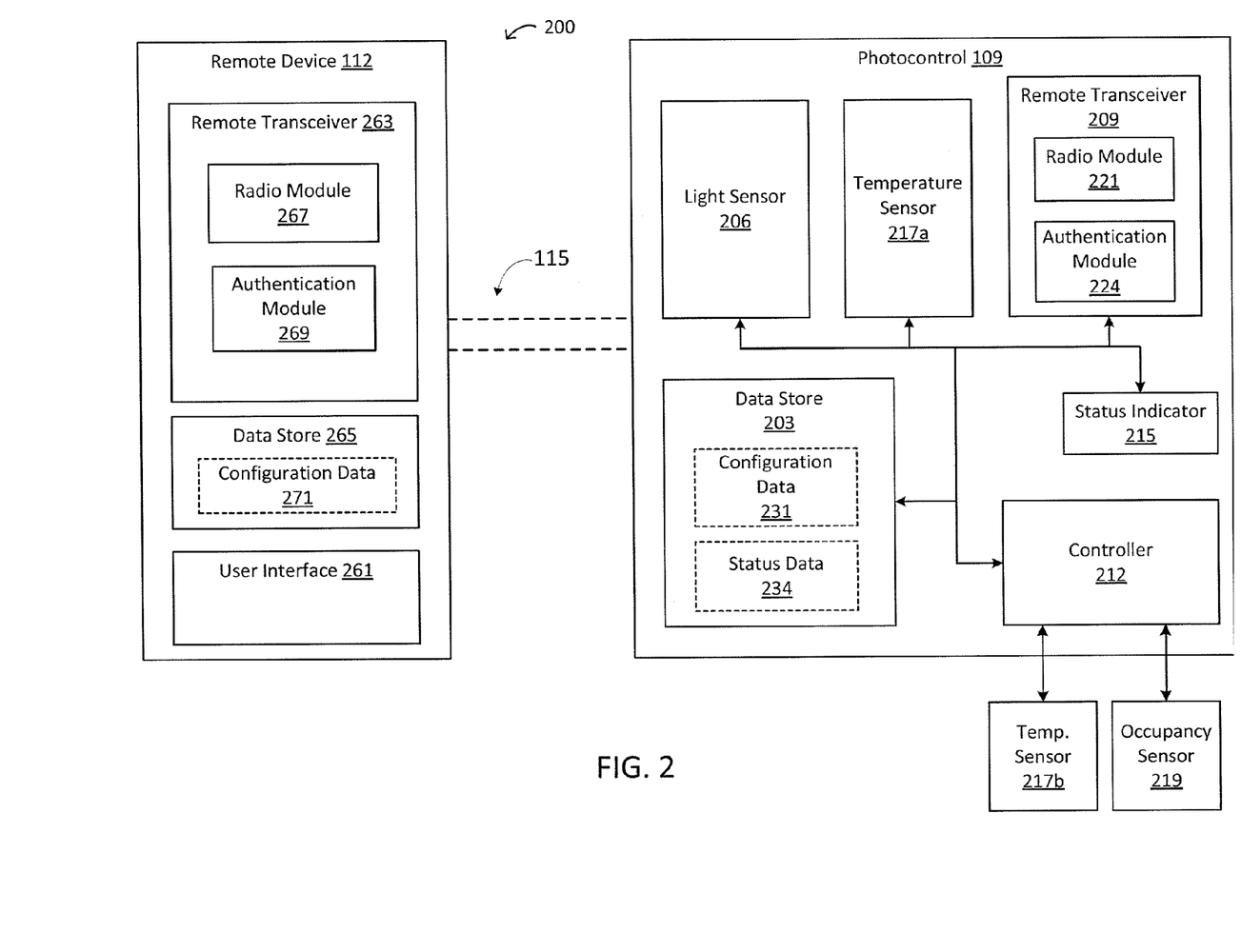
FIG. 2 is a drawing of a remote communication scenario that may occur in the lighting environment according to various embodiments of the present disclosure

With reference to FIG. 2, shown is an exemplary remote communication scenario 200 that may occur in the lighting environment 100 according to various embodiments. This remote communication scenario 200 includes the photocontrol 109 and the remote device 112, which are in data communication with each other via the network 115. The network 115 includes wireless networks such as may be defined by Bluetooth® (including BLE), Wi-Fi®, the IEEE 802.15 standards family, and/or other possible technology standards and protocols.

The photocontrol 109 comprises a device to control the light output from one or more associated light fixtures. Alternatively, the photocontrol 109 can represent a plurality of such devices which may be in communication with the remote device 112. Various functionality may be executed in the photocontrol 109 according to various embodiments. Also, various data is stored in a data store 203 that is accessible to the photocontrol 109. The data store 203 may be representative of a plurality of data stores 203 as can be appreciated. The data stored in the data store 203, for example, is associated with the operation of the various functional entities described below.

The components included on the photocontrol 109, for example, include a light sensor 206, a remote transceiver 209, a controller 212, a status indicator 215, as well as possibly a temperature sensor 217a and/or other components or functionality not discussed in detail herein. In some implementations, the photocontrol 109 is in communication with components external to the photocontrol 109, such as a temperature sensor 217b, an occupancy sensor 219, and/or other possible components. The components of the photocontrol 109 may communicate using DALI™ (digital addressable lighting interface), a data bus, and/or other possible protocols. The light sensor 206 reports the amount of ambient light that it detects, which the photocontrol 109 may use as an input or factor for determining a level of light output (also referred to as "brightness") from the associated light fixture. The remote transceiver 209 facilitates establishing the network 115 with a remote device 112 through which commands can be received for the photocontrol 109. Some of these received commands may be instructions for modifying the configuration that the photocontrol 109 uses for determining a level of light output from a light fixture, as well as other possible purposes.

The remote transceiver 209 comprises a radio module 221, an authentication module 224, and other possible components. The radio module 221 provides a wireless network interface to facilitate establishing the network 115 using a radio frequency (RF) communication link with the remote device 112. The authentication module 224 is used to authenticate the remote device 112 as a device from which a command to the photocontrol 109 should be accepted via the network 115. The authentication may be carried out using an authentication protocol included in a protocol of the network 115, such as a Bluetooth PIN, and/or may use other authentication protocols as can be appreciated. The authentication module 224 may use one or more credentials stored in the photocontrol 109 during the course of the authentication.

The controller 212 determines the actions to undertake for the photocontrol 109 related to light output from the light fixture based on inputs received from a programmed schedule, the various sensors, and/or the remote transceiver 209. For example, based on a programmed schedule, the controller 212 may determine that light output from a light fixture should be dimmed and may initiate the action by signaling a dim driver via DALI to dim the LED lighting element(s) for the light fixture. The controller 212 may be configured via programming and parameters that can be stored in the photocontrol 109.

The status indicator 215 may be made up of one or more components that provide an indication of the status of various functions of the photocontrol 109. For example, the status indicator 215 may comprise a small light, a speaker capable of producing an audible indication, and/or other possible indication mechanisms. In some implementations, the lighting element of the light fixture may also be used as part of the status indicator 215. For example, the lighting element of a light fixture may flash when a communication session is being attempted with the photocontrol 109 managing the light fixture. As another example, the status indicator may be a small LED light that is red when the photocontrol 109 is not communicating with a remote device 112, and is green if a communication session with a remote device 112 is established.

The temperature sensors 217a-b report the temperature of the light fixture and/or other possible areas such that, among other possible functions, the photocontrol 109 can manage the level of the light output based upon the temperature. The temperature sensor(s) may be implemented using a thermistor or other temperature sensing device, as can be appreciated. In some implementations in which both temperature sensors 217a and 217b are available, the controller 212 may use one of the sensors, such as the external temperature sensor 217b. In some implementations in which only the internal temperature sensor 217a is available, the photocontrol 109 can make dimming decisions based on predicted light fixture temperature. For example, after one hour at 100% brightness, the light fixture is estimated to be 20° C. above the temperature measured by the temperature sensor 217a. The occupancy sensor 219 detects occupancy of an area by people such that, among other possible functions, the photocontrol 109 can manage the level of the light output based upon the occupancy. The occupancy sensor 219 is representative of one or more sensors using infrared (IR), video, ultrasonic, and/or microwave technology, as can be appreciated. Some components employed by the photocontrol 109, such as the various sensors, may be remotely located from the photocontrol.

The data stored in the data store 203 includes, for example, configuration data 231, status data 234, and potentially other data. The configuration data 231 can include the current programming and/or parameters used to configure components of the photocontrol 109, such as the controller 212; one or more stored configurations (i.e. "profiles") usable for the programming the photocontrol 109; one or more identifiers for the photocontrol 109 and/or light fixture 103; credentials used to authenticate a remote device 112; and/or other possible data. The status data 234 includes a record of the state of various components and activities of the photocontrol 109. For example, the status data 234 may include data indicating that the current state of a light of a light fixture is "ON" and dimmed to 70% of the maximum brightness as a result of action by the controller 212 based on input from the light sensor 206 and a schedule using the time of day. The data stored in the status data 234 may be stored and read by the various components of the photocontrol 109. In some embodiments, the status data 234 may keep all or a portion of the historical data stored in the status data 234, such as the past actions initiated by the controller 212 for diagnostic or other purposes.

The remote device 112 is representative of the types of remote devices that may be used to communicate with the photocontrol 109 via the network 115. The remote device 112 may comprise, for example, a computer system, such as a smartphone, tablet computer, or other devices with like capability. The remote device 112 may also include a user interface 261, remote transceiver 263, a data store 265, and other possible components. The user interface 261 may comprise, for example, one or more devices such as tactile buttons and/or a display such as a liquid crystal display (LCD), LED display, organic light emitting diode (OLED) display, or other types of display devices. In some implementations, the display may be touch-sensitive. The user interface 261 can provide an indication of the status of various functions of the remote device 112 and photocontrol 109. For example, the user interface 261 may include a display that overlays onto a map each of the photocontrols detected within radio range of the remote device 112.

The data store 265 includes, for example, configuration data 271 and potentially other data associated with the operation of the remote device 112. The configuration data 271 can include one or more stored profiles usable for the programming photocontrols 109, various data (model numbers, customer names, light fixture wattage, communication history, location, etc.) corresponding to identifiers for the photocontrols 109 and/or light fixtures 103, credentials used to authenticate with photocontrols 109, and/or other possible data.

The remote transceiver 263 comprises a radio module 267, authentication module 269, and other possible components. The radio module 267 provides a wireless network interface to facilitate establishing the network 115 using an RF communication link with the photocontrol 109. The authentication module 269 is used to authenticate the remote device 112 to the photocontrol 109 via the network 115. The authentication module 269 may use one or more credentials stored in the remote device 112 during the course of the authentication.

Next, an exemplary description of the operation of the various components of the communication scenario is provided. To begin, a user of the remote device 112 may provide input to the user interface 261 requesting to discover any nearby photocontrols. Upon receiving the input, the remote device 112 begins identifying any photocontrol devices 109 within range of the remote transceiver 263. The identification process may be carried out according to the one or more protocols supported by the remote transceiver 263, such as Bluetooth, Wi-Fi, etc. In some implementations, photocontrols 109 periodically transmit a respective identifier that may be received by any remote devices 112 within range. In other implementations, the remote device 112 may first transmit a message requesting any photocontrols 109 within range to transmit a respective identifier that may be received by the remote device 112. The identifier transmitted by each of the photocontrol(s) 109 may be representative of one or more pieces of identifying information such as a serial number, a network address, a model number, a geographic coordinates for its location, an assigned name or other identifier, and/or other types of identifying information for the respective photocontrol 109 and associated light fixture 103. The user interface 261 may be used to indicate to the user that a search for any nearby photocontrol(s) 109 is underway by, for example, displaying a message.

Figure 3:
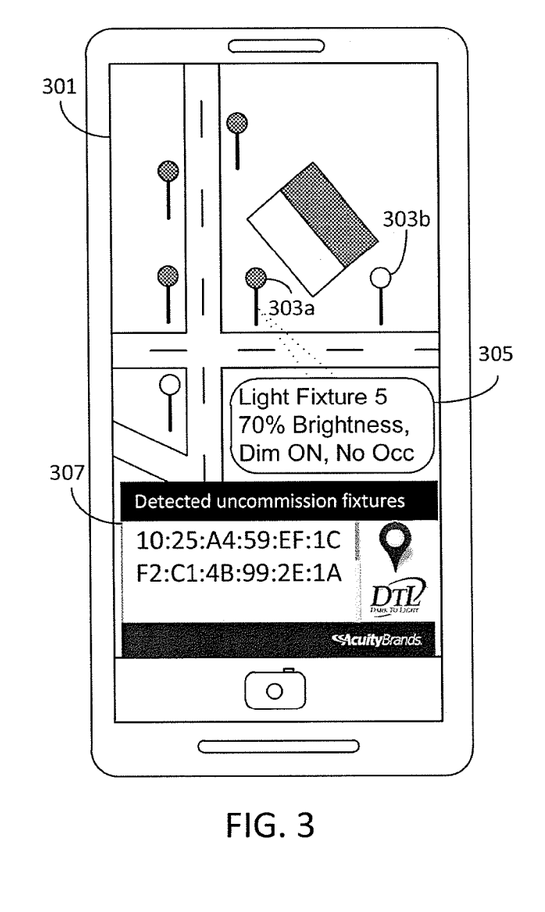
FIGS. 3-9 are pictorial diagrams of an exemplary user interfaces rendered by a remote device in the remote communication scenario of FIG. 2 according to various embodiments of the present disclosure.

Photocontrols 109 discovered may be presented in the user interface 261, such as shown in the exemplary discovery screen of FIG. 3. In FIG. 3, the discovery screen 301 presents a map of the vicinity of the remote device 112 that includes various markers, such as the marker 303a, each corresponding to a photocontrol in the approximate location as shown on the map. The location shown for each photocontrol 109 may be based on information obtained from the respective photocontrol 109 and/or based on the estimated distance from the current location of the remote device 112. Within the discovery screen 301, a user may select an individual marker for a photocontrol, such as the marker 303a, which then can provide a status panel 305 displaying additional information for the particular photocontrol 109 and the associated light fixture 103. For example, the information may include one or more identifiers, the current state of the lighting element, a dim level, a synopsis of the current configuration, and/or other possible information.

In some implementations, the photocontrol 109 may also offer light fixture identification functionality, whereby the photocontrol 109 for a light fixture 103 identifies the light fixture based upon retrieval of one or more identifiers that may be pre-programmed in the light fixture. For example, the light fixture 103 may be programmed, at the time of manufacture and/or by the remote device 112, with an identifier representing the model number of the light fixture. Later, using the display of the remote device 112, a user may quickly identify the model of the particular light fixture 103 being managed by the photocontrol 109 and, by performing a discovery of the neighboring photocontrols 109, the user may be presented with an inventory of the nearby light fixtures 103. In other implementations, the photocontrol 109 may be programmed with one or more identifiers for the light fixture 103 instead of the programming residing in the light fixture itself.

The identifier(s) programmed for a light fixture 103 may provide the identifying information (e.g. the model number is the identifier) and/or the identifier may be used in conjunction with logic in the remote device 112 to provide the identification information. For example, a photocontrol 109 may use the manufacturer's serial number as an identifier. During discovery, the remote device 112 may obtain the identifier, then determine various information about the light fixture from a prepopulated database of light fixture information based on the serial number. The light fixture information may include, for example, the model number, installed lighting elements, date of manufacture, customer name, power consumed (also referred to as "wattage"), etc. In addition, the photocontrol 109 may be configured to provide the current dimming level to the remote device 112. The database of light fixture information can include power usage for a given light fixture 103 at each dimming level, thereby allowing the remote device 112 to provide the user with current power consumption for a given light fixture 103.

The discovery screen 301 may modify the markers to distinguish photocontrols 109 that have been previously detected and/or commissioned from other photocontrols 109, such as the marker color used to distinguish marker 303a from marker 303b. In addition, a notification panel 307 may be placed within the discovery screen 301 to alert a user that newly detected and/or uncommissioned photocontrols have been discovered in the vicinity. The notification panel 307 may further provide one or more bits of identifying information for the photocontrol, such a network address and/or other types of information (not shown) such as a model number, serial number, location, etc.

Figure 4:
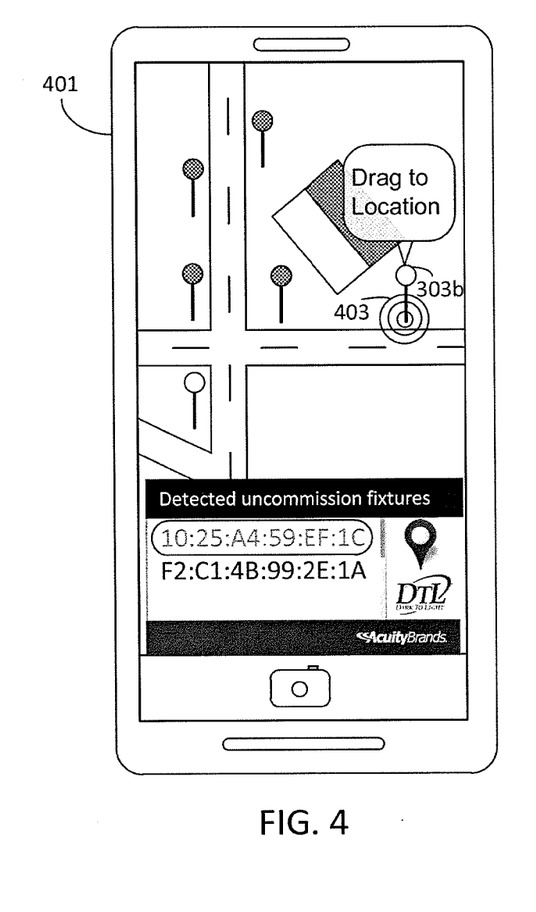

In FIG. 4, the user interface is shown with an exemplary commissioning screen 401. In the commissioning screen 401, a user has selected the marker 303b, corresponding to one of the two uncommissioned photocontrols 109, for commissioning. During the commissioning, the user takes administrative control of a given photocontrol 109, which may include configuring one or more user credentials, configuring the programming for managing light output from a light fixture 103 associated with the photocontrol 109, specifying the location of the photocontrol, and/or other possible activities. For example, the commissioning screen 401 may provide a location adjustment indicator 403 whereby the commissioning user can specify a more precise location on the map for the particular photocontrol 109. Once the location is specified, it may be stored in the particular photocontrol 109 and/or in the remote device 112.

Moving on, if a marker for a photocontrol 109 is selected from the discovery screen 301 and/or commissioning screen 401, the remote device 112 may initiate a point-to-point communication session with the photocontrol 109 by establishing the network 115. In order to establish the communication session with the photocontrol 109, the remote device 112 may transmit one or more credentials via the network 115. The credential(s) may be, for example, a Bluetooth PIN, a data key, username/password, etc. Thereafter, the photocontrol 109 may authenticate the credential received from the remote device 112 using the authentication module 224. If the credential is successfully authenticated, the communication session is established between the photocontrol 109 and the remote device 112, via the network 115.

In some implementations, the credential of a photocontrol 109 may also be reprogrammed (i.e. modified or replaced) by the user of the remote device 112 upon successful authentication. A confirmation message may be sent to the remote device 112 to confirm establishment of the communication session. The confirmation message may further include status information for the light fixture(s) managed by the photocontrol 109. For example, the status information may include whether the fixture is currently in an enabled or disabled state, features supported by the photocontrol and/or light fixture, dim level, etc.

Figure 5:
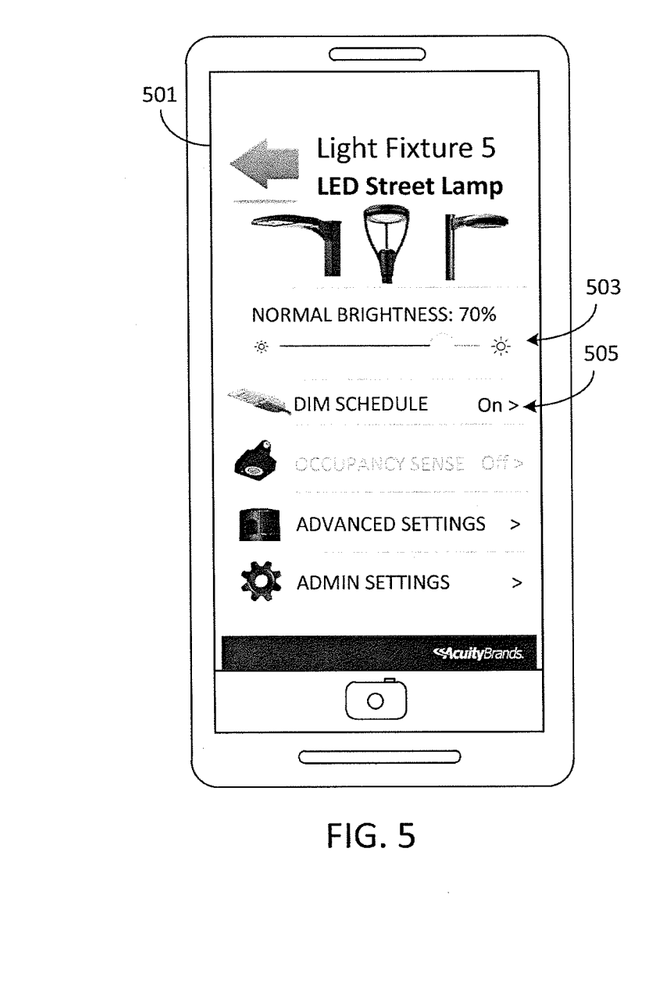

Once the communication session is established, the user interface 261 of the remote device 112 may be used to send commands to adjust the programming of the photocontrol 109, such as can be performed via the exemplary menu screen 501 of FIG. 5. In some implementations, after the communication session is established, the remote device 112 may retrieve the current configuration of the photocontrol 109 and render the user interface of the remote device to reflect the current configuration state of the photocontrol, which may then be adjusted by the user. From the menu screen 501, the remote device 112 may send commands to change the configuration of the photocontrol 109 that result in modifications to the light output or other behaviors of the light fixture 103. The commands may configure and/or override the ambient light sensing logic of the photocontrol device 109, whereby a given portion of the configuration may be effective during defined time periods or upon occurrence of particular events, such as upon detection of an occupant.

The individual configuration changes (e.g. enabling/disabling a feature) made by the user may be individually transmitted to the photocontrol 109 as the configuration change is made, or one or more changes may be transmitted to the photocontrol as a batch periodically and/or as directed by the user. The photocontrol 109 may provide a confirmation of configuration changes received from the remote device 112 by sending a confirmation message to the remote device 112 via the communication session, as well as possibly providing a visual and/or audible confirmation at the light fixture 103 managed by the photocontrol 109. Each photocontrol 109 may locally store its respective configuration, while the remote device 112 may also retain copies of configurations of photocontrols with which it has been in communication.

In some implementations, the photocontrol 109 may offer dimming functionality whereby the brightness of the light output from the light fixture 103 may be adjusted incrementally rather than the light output being either fully 'on' or fully 'off'. Using a previously established communication session, the remote device 112 may send dimming commands and/or dimming schedules to the photocontrol 109. For example, using the brightness adjustment 503 of the menu screen 501, a user can adjust the brightness level used for normal ("default") operating conditions in which light output is needed from the lighting fixture (e.g. at night). Additional programming options based on a schedule, occupancy, etc., may also override this default setting.

Figure 6:
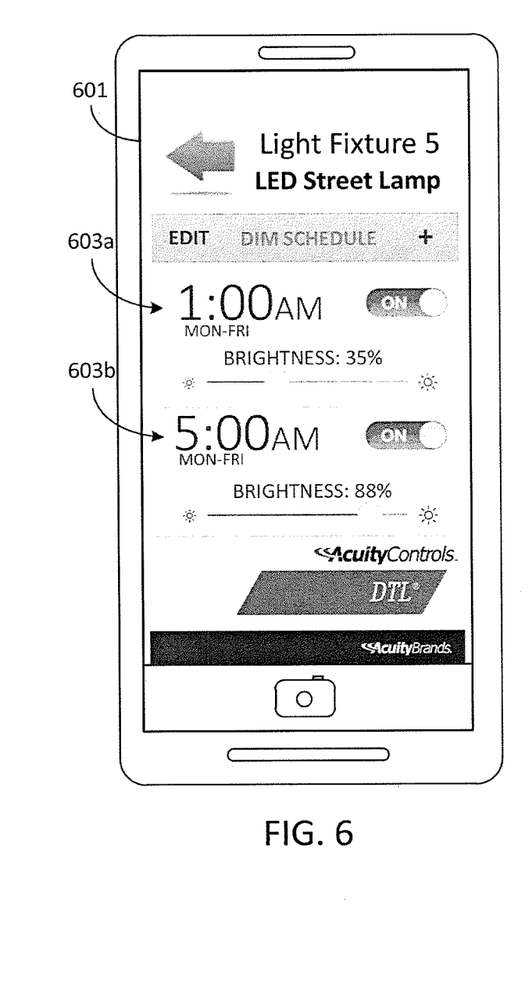

In addition, by selecting the dim schedule 505 of the menu screen 501, the user is presented with a scheduling interface, such as the exemplary scheduling screen 601, shown in FIG. 6. Using the scheduling screen 601, a user of the remote device 112 can program one or more schedule events 603 based on the time of day, including the date and/or day of the week. For example, the user has created event 603a to set the brightness level to 35% at 1 A.M., Monday-Friday, which would persist until the event 603b that sets the brightness level to 88% beginning at 5 A.M., Monday-Friday. In the exemplary scheduling screen 601, the events 603 would function to override the default brightness level, such as set using the previously described brightness adjustment 503 in FIG. 5.

The brightness levels in the events 603 and in other screens of the remote device 112 may be adjusted using various techniques. One technique may adjust the light output to an absolute level, such as a command to make the brightness level be 40% of the maximum output or a command to switch to one of many possible preset brightness levels, such as a preset twilight output level or a preset evening output level. Another technique may adjust the brightness relative to the current light brightness level, such as a command to increase the current brightness by 20%, reduce the current brightness by 50%, etc.

In further implementations, the photocontrol 109 may provide temperature protection (also referred to as "temperature foldback") functionality for the light fixture 103. When the lighting element 106 of a light fixture 103 is operating in extreme temperatures, the longevity of the lighting element 106 may be reduced. In these environments, the lifetime of the light element 106 may be extended by adjusting the brightness of the light output from the lighting elements 106 during these temperature extremes. To this end, the photocontrol 109 may include one or both temperature sensors 217*a-b* measuring the temperature of the light fixture 103 and/or the ambient air temperature. The photocontrol 109 may be programmed to initiate a particular action based upon the detected temperature meeting or exceeding a determined threshold. The photocontrol 109 may be further programmed to initiate additional actions if the temperature of the light fixture 103 fails to respond to the previous actions.

For example, the photocontrol 109 may be configured to reduce the light output from the light fixture 103 to no more than 50% of the maximum light output if the temperature of the light fixture 103 exceeds 120° F. The programming of the photocontrol 109 may further reduce the light output from the light fixture 103 to no more than 25% of the maximum light output if the temperature of the light fixture 103 remains above 120° F. for five minutes after the previous action. The threshold temperatures, the actions undertaken, and other programming of the photocontrol 109 may be modified by a user using the remote device 112.

In still other implementations, the photocontrol 109 may provide occupancy sensing functionality for the light fixture 103. For example, as shown in the exemplary occupancy screen 701 of FIG. 7, the photocontrol 109 may be programmed using the occupancy brightness adjustment 703 to set the light output from a light fixture 103 at 68% when ambient light level falls below a threshold (e.g. during the evening) and occupants have been detected in the vicinity. Continuing this example, the photocontrol 109 may then retain this brightness level after detection of occupants for 25 minutes, as configured by the timeout 706. Thereafter, the brightness of the light output may return to the configured level after the timeout period expires.

Figure 7:
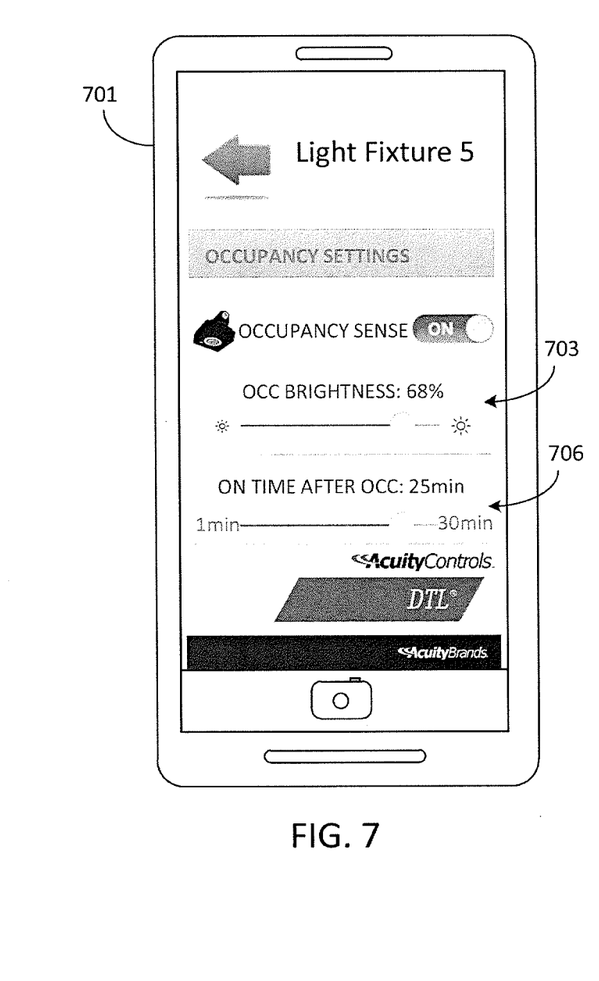

The photocontrol 109 may further be programmed with criteria (not shown) for which the occupancy sensing functionality is enabled or disabled, different timeout periods, different actions to be undertaken, etc. For example, the occupancy sensing functionality may be disabled until from 6 A.M.-10 P.M., such that the brightness is not adjusted based on occupancy during this period. From 10 P.M.-6 A.M., the brightness may be modified by the occupancy sensor to a programmed level based on the detected occupancy of the area. In another exemplary implementation, the occupancy sensing functionality is enabled during time periods in which the brightness level for the light fixture is set to less than the occupancy brightness level (e.g. 68% as shown in FIG. 7). In this manner, the occupancy sensing functionality can be used to ensure a minimum brightness level when occupants are detected, while also not reducing the brightness when the brightness exceeds the occupancy brightness level. The criteria for the enabled or disabled periods, timeout periods, the actions undertaken, and other programming of the photocontrol 109 may be modified by a user using the remote device 112.

Figure 8:
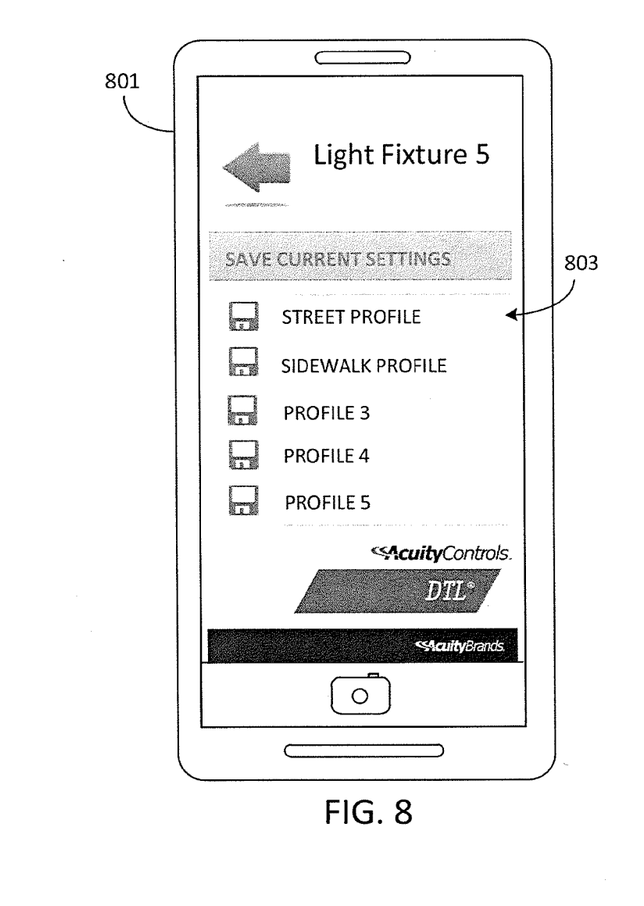
Figure 9:
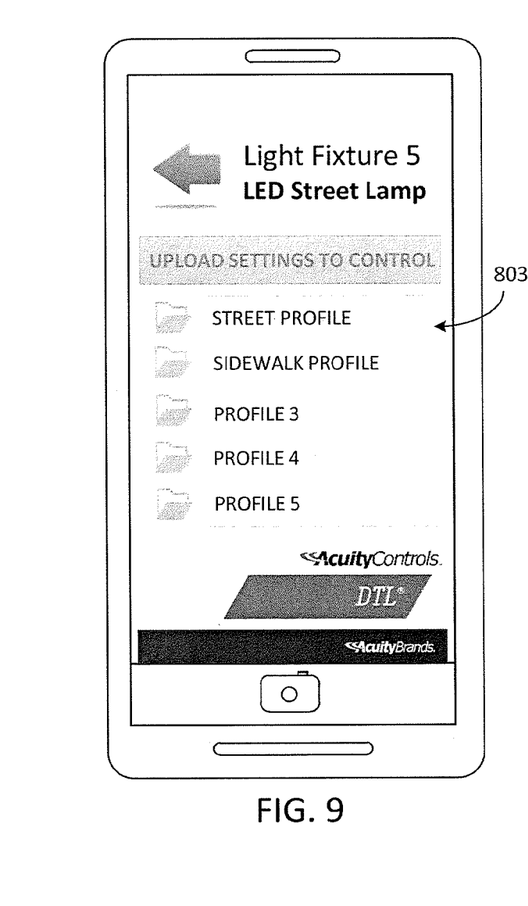

In still further implementations, the remote device 112 can save all or portions of a configuration of a photocontrol 109 as a profile, which can then later be applied to other photocontrols by the remote device 112. For example, as shown in the saved profile screen 801 of FIG. 8, once the configuration of a photocontrol 109 is configured as desired by the user, the configuration can be saved by the user as one of the various profiles 803 that can be stored on the remote device 112. In variations of these implementations, saving a profile may store defined portions of a profile, such as only dimming schedules, the complete configuration except device-specific identifiers (names, network addresses, etc.), and/or other possibilities. In addition, the profile and/or an identifier for the profile may also be stored on the photocontrol 109. In this manner, another user, possibly with a different remote device, can quickly determine or confirm the complete configuration of a given photocontrol by identifying the name of the configuration profile that the photocontrol 109 is configured with (e.g. "Street Profile"). Similarly, as shown in FIG. 9, the profiles 803 stored on the remote device 112 may be used to apply all or portions of a configuration to one or more photocontrols 109, thereby obviating the need to the user to step through each individual configuration change that would otherwise be performed on each of the photocontrols to be configured.

If during the course of operation, no input is received through the user interface 261 of the remote device 112 for a period of time, the remote device 112 may enter a low-power "sleep" state in order to preserve battery life. For example, if a user sends no commands to the photocontrol 109, nor provides any other input through the user interface 261 for five minutes, the remote device 112 may enter the sleep state. In some implementations, the remote device 112 may "wake" from the sleep mode after input is received from the user interface 261 and may resume the communication session with the same photocontrol 109. In other implementations, no previous state information may be preserved from before entering the sleep state. Similarly, the photocontrol 109 may terminate a communication session after a period of time if no commands have been received from the remote device 112 participating in the communication session. This may be useful to prevent the accumulation of stale communication sessions for which the corresponding remote device 112 has, for example, gone out of communication range, gone to sleep, etc.

Figure 10:
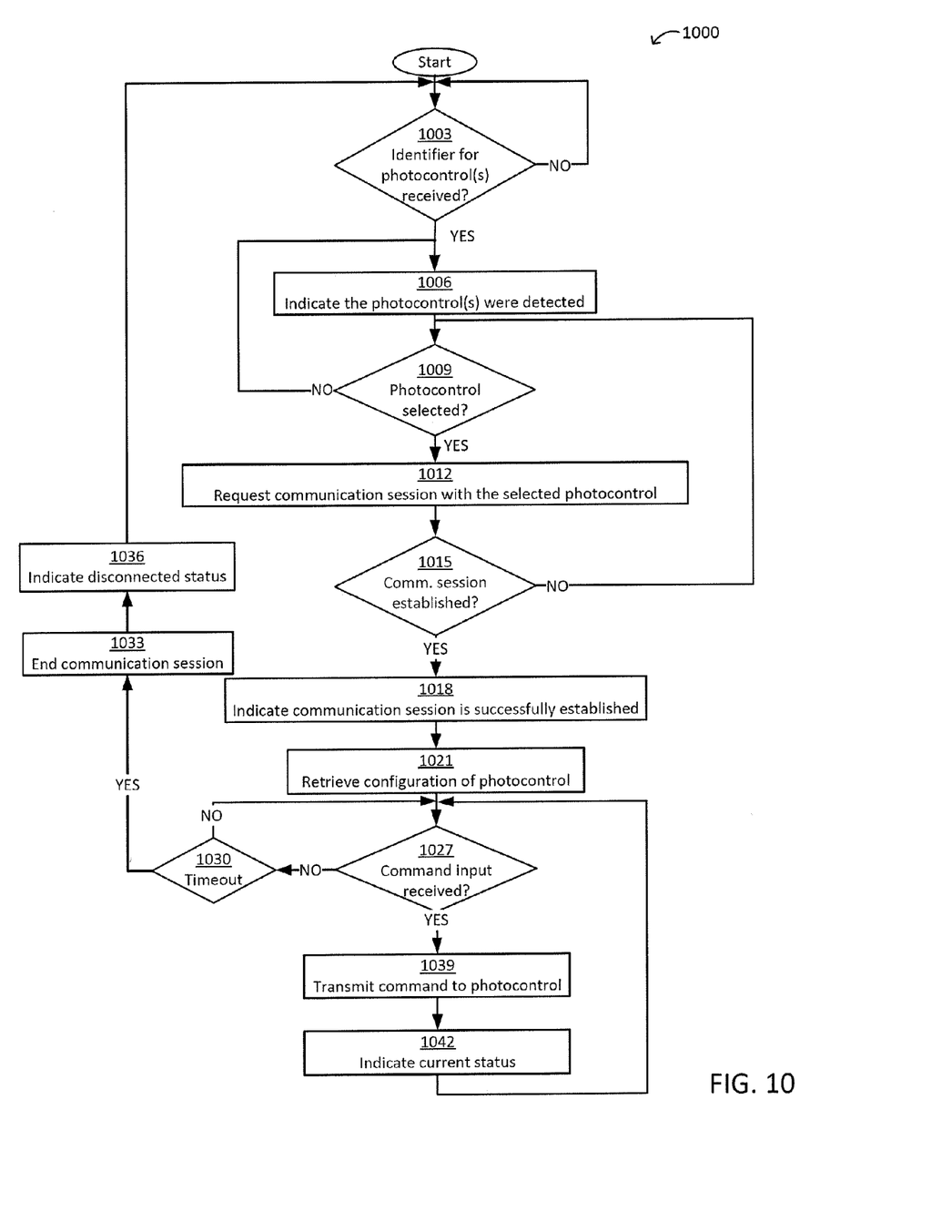
FIG. 10 is a flowchart illustrating one example of functionality implemented as portions of a remote device implemented in the remote communication scenario of FIG. 2 according to various embodiments of the present disclosure.

Moving on to FIG. 10, shown is a flowchart that provides one example of the operations for a method 1000 of the remote device 112 in the remote communication scenario 200 according to various embodiments. It is understood that the flowchart of FIG. 10 provides merely an example of the many different types of functional arrangements that may be employed to implement the operations of the method 1000 as described herein. The operations depicted in the flowchart of FIG. 10 may be initiated once the remote device 112 is available for communication.

Beginning with block 1003, the remote device 112 may determine whether an identifier has been received from any photocontrol devices 109 within range of the remote transceiver 263 of the remote device. The identification process may be carried out according to the one or more protocols supported by the remote transceiver 263, such as Bluetooth, Wi-Fi, etc. In some implementations, photocontrols 109 periodically transmit a respective identifier that may be received by any remote devices 112 within range. In other implementations, the remote device 112 may first transmit a message requesting any photocontrols 109 within range to transmit a respective identifier that may be received by the remote device 112. The identifier transmitted by each of the photocontrol(s) 109 may be representative of one or more pieces of identifying information such as a serial number, a network address, a model number, a geographic coordinates for its location, an assigned name or other identifier, and/or other types of identifying information for the respective photocontrol 109 and associated light fixture 103.

Next, in block 1006, any photocontrols 109 discovered are presented in the user interface 261 of the remote device 112. The user interface 261 may be updated periodically as the various photocontrols 109 are detected. In some implementations, the user interface presents a map of the vicinity of the remote device 112 that includes various markers, where the location of each of the markers corresponds to the location of a photocontrol. The location for each photocontrol 109 may be based on information obtained from the photocontrol 109, based on the location stored in the remote device 112, and/or based on the estimated distance from the current location of the remote device 112. Through the user interface 261, a user may select an individual marker for a particular photocontrol in order to initiate a communication session with which to configure the photocontrol 109.

Then, in block 1009, the method 1000 determines whether a photocontrol is selected with which a communication session should be initiated. If not, execution of the method 1000 returns to block 1006. Alternatively, if a photocontrol 109 has been selected, in block 1012, the remote device 112 may request to establish a point-to-point communication session with the selected photocontrol 109. In order to establish the communication session with the photocontrol 109, the remote device 112 may transmit one or more credentials via a wireless network interface. The credential(s) may be, for example, a Bluetooth PIN, a data key, username/password, etc. Establishing the communication session may be carried out by establishing a network 115 with the selected photocontrol 109, but may, in some implementations, require additional authentication and/or encryption operations beyond what is necessary to establish the network 115.

For example, if the remote device 112 is communicating with the photocontrol 109 via Bluetooth, the communication session may be established when the network 115 is established using a Bluetooth PIN as an authentication credential. As another example, if the remote device 112 is communicating with the photocontrol 109 via unencrypted Wi-Fi, the network 115 may be implemented using Wi-Fi, while the authentication for the communication session may be implemented as another layer atop the network 115. In some implementations, the communication session may also implement encryption in order to retain confidentiality of the credential(s) during transmission between the remote device 112 and the photocontrol 109. The encryption may be carried out using the Advanced Encryption Standard (AES), Triple Data Encryption Standard (3-DES), etc.

When the photocontrol 109 has successfully authenticated the credential, a confirmation message may be sent to the remote device 112 to confirm establishment of the communication session. Subsequently, in block 1015, the remote device 112 determines whether the confirmation message has been received indicating that the communication session has been successfully established. If the communication session was not successfully established, execution of the method 1000 returns to block 1009. Alternatively, if the confirmation message has been received, in block 1018, the remote device 112 may indicate, via the user interface, that the communication session has been established. In some implementations, the indication of a successfully established session is an absence of any error or failure message. In other implementations, the successful indication may further include presentation status information for the photocontrol 109 and/or the associated light fixture(s).

Next, in block 1021, the remote device 112 may retrieve the current configuration of the photocontrol 109 and render the user interface of the remote device to reflect the current configuration state of the photocontrol, which may then be adjusted by the user. Then, in block 1027, the remote device 112 determines if input for a command to change the configuration of the photocontrol 109 was received through the user interface 261. If no input was received, in block 1030, the remote device 112 determines whether a time out has occurred. Alternatively, if input was received, execution of the method 1000 proceeds to block 1039. In block 1030, if a timeout has not occurred, then execution of the method 1000 returns to block 1027. If a timeout has occurred, in block 1033, the remote device 112 may terminate the communication session with the photocontrol 109. Thereafter, in block 1036, the remote device 112 may indicate the disconnected state, then enter a sleep state. Once input is again received through the user interface 261, the remote device 112 may wake and return to block 1003.

Returning to block 1039 where input for a command was timely received through the user interface 261, the command may be transmitted to the photocontrol 109 via the communication session. The individual configuration changes (e.g. configuring a feature) made by the commands may be individually transmitted to the photocontrol 109 as the configuration change is made, or one or more changes may be transmitted to the photocontrol as a batch periodically and/or as directed by the user. Next, in block 1042, the remote device 112 may indicate the result of the command via the user interface 261, where the result is received as a confirmation message from the photocontrol 109. Thereafter, execution of the method 1000 may return to block 1027.

Figure 11:
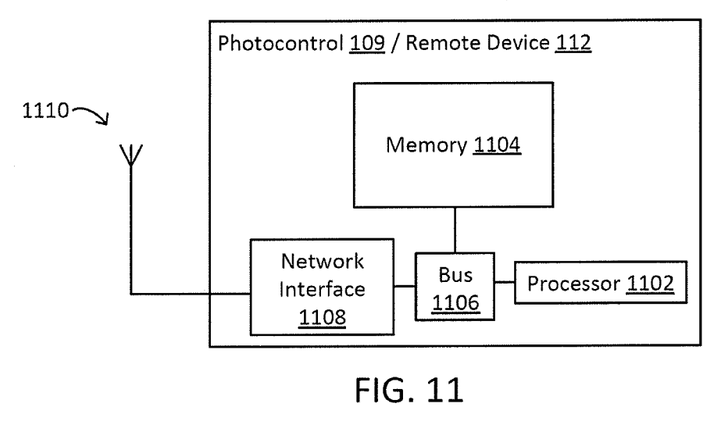
FIG. 11 is a schematic block diagram that provides one example illustration of a photocontrol device/remote device employed in the remote communication scenario of FIG. 2 according to various embodiments of the present disclosure.

Next, in FIG. 11, shown is a block diagram depicting an example of a photocontrol 109/remote device 112 used for implementing the techniques disclosed herein within a lighting environment 100. The photocontrol 109/remote device 112 can include a processing device 1102. Non-limiting examples of the processing device 1102 include a microprocessor, an application-specific integrated circuit ("ASIC"), a state machine, or other suitable processing device. The processing device 1102 can include any number of processing devices, including one. The processing device 1102 can be communicatively coupled to computer-readable media, such as memory device 1104. The processing device 1102 can execute computer-executable program instructions and/or access information respectively stored in the memory device 1104.

The memory device 1104 can store instructions that, when executed by the processing device 1102, cause the processing device 1102 to perform operations described herein. The memory device 1104 may be a computer-readable medium such as (but not limited to) an electronic, optical, magnetic, or other storage device capable of providing a processor with computer-readable instructions. Non-limiting examples of such optical, magnetic, or other storage devices include read-only ("ROM") device(s), random-access memory ("RAM") device(s), magnetic disk(s), magnetic tape(s) or other magnetic storage, memory chip(s), an ASIC, configured processor(s), optical storage device(s), or any other medium from which a computer processor can read instructions. The instructions may comprise processor-specific instructions generated by a compiler and/or an interpreter from code written in any suitable computer-programming language. Non-limiting examples of suitable computer-programming languages include C, C++, C#, Visual Basic, Java, Python, Perl, JavaScript, and the like.

The photocontrol 109/remote device 112 can include a bus 1106 that can communicatively couple one or more components of the corresponding device. Although the processor 1102, the memory 1104, and the bus 1106 are depicted in FIG. 11 as separate components in communication with one another, other implementations are possible. For example, the processor 1102, the memory 1104, and the bus 1106 can be components of printed circuit boards or other suitable devices that can be disposed in a photocontrol 109 and remote device 112 to store and execute programming code.

The photocontrol 109/remote device 112 can also include a network interface device 1108. The network interface device 1108 can be a transceiving device configured for wireless communication via an antenna 1110. A non-limiting example of the network interface device 1108 is an RF transceiver and can include one or more components for establishing communication sessions via the network 115.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other storage devices, transmission devices, or display devices of the computing platform.

The system or systems discussed herein are not limited to any particular hardware architecture or configuration. A computing device can include any suitable arrangement of components that provide a result conditioned on one or more function calls. Suitable computing devices include multi-purpose microprocessor-based computer systems accessing stored software that programs or configures the computing system from a general-purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that those skilled in the art, upon attaining an understanding of the foregoing, may readily produce alterations to, variations of, and equivalents to such aspects. Accordingly, it should be understood that the present disclosure has been presented for purposes of example rather than limitation, and does not preclude inclusion of such modifications, variations, and/or additions to the present subject matter as would be readily apparent to one of ordinary skill in the art.

Therefore, the following is claimed:

1. A method for lighting control of a light fixture by a remote device, the method comprising:
   receiving, via a wireless network interface, an identifier from a photocontrol device within range of the wireless network interface of the remote device, the photocontrol device managing light output of the light fixture, the photocontrol device being removably attached to the light fixture;
   transmitting, via the wireless network interface, a request to establish a point-to-point communication session directly with the photocontrol device using the wireless network interface, the request comprising an authentication credential;
   upon receiving, via the wireless network interface, an acknowledgement from the photocontrol device confirming establishment of the point-to-point communication session, using the established point-to-point communication session for:
      receiving a configuration for the photocontrol device that specifies how the photocontrol device is programmed to manage dimming the light output of the light fixture according to a schedule associated with a time of day; and
      in response to input received, via a user interface of the remote device, to adjust the dimming schedule, instructing the photocontrol device to modify the configuration for the photocontrol device specifying the dimming schedule based upon the received input.

2. The method of claim 1, further comprising storing at least a portion of the configuration of the photocontrol device as a profile in the remote device, wherein the remote device can use the profile to apply the at least a portion of the configuration of the photocontrol device to one or more other photocontrol devices.

3. The method of claim 1, further comprising rendering, via the user interface of the remote device, interface elements corresponding to various portions of the configuration received for the photocontrol device, wherein the interface elements are responsive to input received to modify the configuration.

4. The method of claim 1, wherein the photocontrol device manages light output based further upon input received from an occupancy sensor that overrides the schedule, the configuration having one or more settings corresponding to occupancy sensing.

5. The method of claim 1, wherein the input received to adjust the configuration corresponds to an adjustment of a dimming level of light output for the light fixture or a change to the schedule.

6. The method of claim 1, wherein, based at least in part upon the identifier from the photocontrol device, the remote device determines attributes associated with the photocontrol device including one or more of: a model number of the photocontrol device, a model number of the light fixture, a manufacture date for the photocontrol device, a manufacture date for the photocontrol device, a wattage of the light fixture, and a customer name.

7. The method of claim 6, further comprising rendering, in the user interface of the remote device, interface elements corresponding to at least a portion of the attributes.

8. The method of claim 1, wherein the photocontrol device manages light output based further upon input received from a temperature sensor that overrides the schedule, the configuration having one or more settings corresponding to temperature protection.

9. A non-transitory computer-readable medium embodying a program executable in a remote device to provide for lighting control of a light fixture by the remote device, the program comprising code for:
receiving, via a wireless network interface, an identifier from a photocontrol device within range of the wireless network interface of the remote device, the photocontrol device managing light output of the light fixture, the photocontrol device being removably attached to the light fixture;
transmitting, via the wireless network interface, a request to establish a point-to-point communication session directly with the photocontrol device using the wireless network interface, the request comprising an authentication credential;
upon receiving, via the wireless network interface, an acknowledgement from the photocontrol device confirming establishment of the point-to-point communication session, using the established point-to-point communication session for:
receiving a configuration for the photocontrol device that specifies how the photocontrol device is programmed to manage dimming the light output of the light fixture; and
in response to input received, via a user interface of the remote device, to adjust a schedule for the dimming, instructing the photocontrol device to modify the configuration for the photocontrol device specifying the dimming schedule based upon the received input.

10. The non-transitory computer-readable medium of claim 9, wherein the input received to adjust the configuration corresponds to an adjustment of a dimming level of light output for the light fixture or a change to the schedule.

11. The non-transitory computer-readable medium of claim 9, wherein the program further comprises code for rendering, via the user interface of the remote device, interface elements corresponding to various portions of the configuration received for the photocontrol device, wherein the interface elements are responsive to input received to modify the configuration.

12. The non-transitory computer-readable medium of claim 9, wherein the program further comprises code for storing at least a portion of the configuration of the photocontrol device as a profile in the remote device, wherein the remote device can use the profile to apply the at least a portion of the configuration of the photocontrol device to one or more other photocontrol devices.

13. The non-transitory computer-readable medium of claim 9, wherein the photocontrol device manages light output based further upon input received from an occupancy sensor that overrides the schedule, the configuration having one or more settings corresponding to occupancy sensing.

14. A remote device for configuring a photocontrol device to manage light output of a light fixture, comprising:
a processor;
a wireless network interface; and
a memory configured with instructions that, when executed by the processor, cause the remote device to:
receive, via the wireless network interface, an identifier from the photocontrol device within range of the wireless network interface of the remote device, the photocontrol device being removably attached to the light fixture;
transmit, via the wireless network interface, a request to establish a point-to-point communication session directly with the photocontrol device using the wireless network interface, the request comprising an authentication credential;
upon receiving, via the wireless network interface, an acknowledgement from the photocontrol device confirming establishment of the point-to-point communication session, use the established point-to-point communication session to:
receive a configuration for the photocontrol device that specifies how the photocontrol device is programmed to manage dimming the light output of the light fixture according to a schedule associated with a time of day; and
in response to input received, via a user interface of the remote device, to adjust the dimming schedule, instruct the photocontrol device to modify the configuration for the photocontrol device specifying the dimming schedule based upon the received input.

15. The remote device of claim 14, wherein the photocontrol device manages light output based further upon input received from an occupancy sensor that overrides the schedule, wherein the remote device is responsive to input received to adjust the configuration for the photocontrol device associated with occupancy sensing.

16. The remote device of claim 14, wherein the photocontrol device manages light output based further upon input received from a temperature sensor that overrides the schedule, wherein the remote device is responsive input received to adjust the configuration for the photocontrol device associated with temperature protection.

17. The remote device of claim 14, wherein the input received to adjust the configuration corresponds to an adjustment of a dimming level of light output for the light fixture or a change to the schedule.

18. The remote device of claim 14, wherein the instructions further cause the remote device to store at least a portion of the configuration of the photocontrol device as a profile in the remote device, wherein the remote device can use the profile to apply the at least a portion of the configuration of the photocontrol device to one or more other photocontrol devices.

19. The remote device of claim 14, wherein the instructions further cause the remote device to render, via the user interface of the remote device, interface elements corresponding to various portions of the configuration received for the photocontrol device, wherein the interface elements are responsive to input received to modify the configuration.

20. The remote device of claim 14, further comprising presenting, via the user interface of the remote device, a map having a marker placed in a position on the map that corresponds to a location of the photocontrol device, wherein the remote device receives the location from the photocontrol device.

\* \* \* \* \*